United States Patent

Ichikawa

[11] Patent Number: 5,857,951
[45] Date of Patent: Jan. 12, 1999

[54] LIQUID CONTAINER AND METHOD OF MANUFACTURING SAME

[75] Inventor: Tooru Ichikawa, Misato, Japan

[73] Assignee: Kabushiki Kaisha Hosokawa Yoko, Japan

[21] Appl. No.: 839,145

[22] Filed: Apr. 23, 1997

Related U.S. Application Data

[62] Division of Ser. No. 673,729, Jun. 26, 1996, Pat. No. 5,660,477.

[30] Foreign Application Priority Data

Jun. 28, 1995 [JP] Japan .................................. 7-161928

[51] Int. Cl.$^6$ .............................. B31B 1/84; B65D 30/00
[52] U.S. Cl. ......................... 493/212; 493/213; 493/929
[58] Field of Search ................................ 493/84, 87, 102, 493/109, 115, 193–203, 210, 212, 213, 220, 221, 923, 927, 929, 962, 88, 89, 214, 215, 222, 226, 379, 380, 381, 383, 918

[56] References Cited

U.S. PATENT DOCUMENTS

| | | | |
|---|---|---|---|
| 4,032,064 | 6/1977 | Giggard | 383/120 |
| 4,650,452 | 3/1987 | Jensen | 493/213 |
| 4,718,778 | 1/1988 | Ichidawa | 383/906 |
| 4,720,872 | 1/1988 | Kaczerwaski | 383/120 |
| 5,324,233 | 6/1994 | Owensby | 493/213 |
| 5,348,525 | 9/1994 | Buchanan | 493/213 |
| 5,437,595 | 8/1995 | Smith | 493/213 |
| 5,484,375 | 1/1996 | Owensby | 493/213 |
| 5,660,477 | 8/1997 | Ichikawa | 383/80 |

*Primary Examiner*—John Sipos
*Assistant Examiner*—Christopher W. Day
*Attorney, Agent, or Firm*—Ladas & Parry

[57] ABSTRACT

A liquid container comprises a flexible bag-shaped container body 1 which is provided with two flat portions 3(3*a*,3*b*) as front and back walls and two gusset portions 4(4*a*,4*b*) as side walls which are folded inwardly, and a pipe-shaped delivery unit 2 which is provided with a mouth portion 11 at an upper end thereof to be projected out of an upper end portion of the container body, and a flange portion 12 below the mouth portion to be held at a joining portion 5 of the upper end portion of the container body, wherein each gusset portion 4 has a width approximately equal to that of the flat portion 3, inward end portions 15(15*a*,15*b*) of the two gusset portions being interposed between the flange portion 12 and the flat portion 3 at the joining portion 5. When the liquid container is manufactured, it is preferable that films for the gusset portions are temporarily bonded to a film for the flat portion before the positioning of the delivery unit.

4 Claims, 13 Drawing Sheets

PROCESS OF MANUFACTURING LIQUID CONTAINER

FIG.14
PRIOR ART
14-14 CROSS SECTION

LIQUID CONTAINER AND METHOD OF MANUFACTURING SAME

This is a divisional of application Ser. No. 08/673,729 filed on Jun. 26, 1996 U.S. Pat. No. 5,660,477.

FIELD OF THE INVENTION

The present invention relates to a liquid container to be filled with eatable or uneatable liquids or fluids, for example beverages such as sportsdrink and orange juice, and relates to a method of manufacturing the liquid container.

BACKGROUND OF THE INVENTION

There has been known a container for filling beverages such as sportsdrink and orange juice. The container has a bag-shaped container body formed of a flexible film as forming material and having gusset portion; and a pipe-shaped delivery unit joinied to the container body in a state that its flange portion is held at an end portion of an upper opening of the container body. The conduit portion of the delivery unit is inserted into the container body. It is disclosed in, for example, Japanese Utility Model Application Laid-Open(Kokai) No. 62-134826, which is laid open to the public in 1987.

Such kind of the liquid container is lighter in its weight and can be opened more easily than cans and bottles. Therefore, it can be used as a container to store beverages and sauces for Japanese noodles or Korean-style barbecued meat instead of glass bottles and plastic containers.

Figure 13:
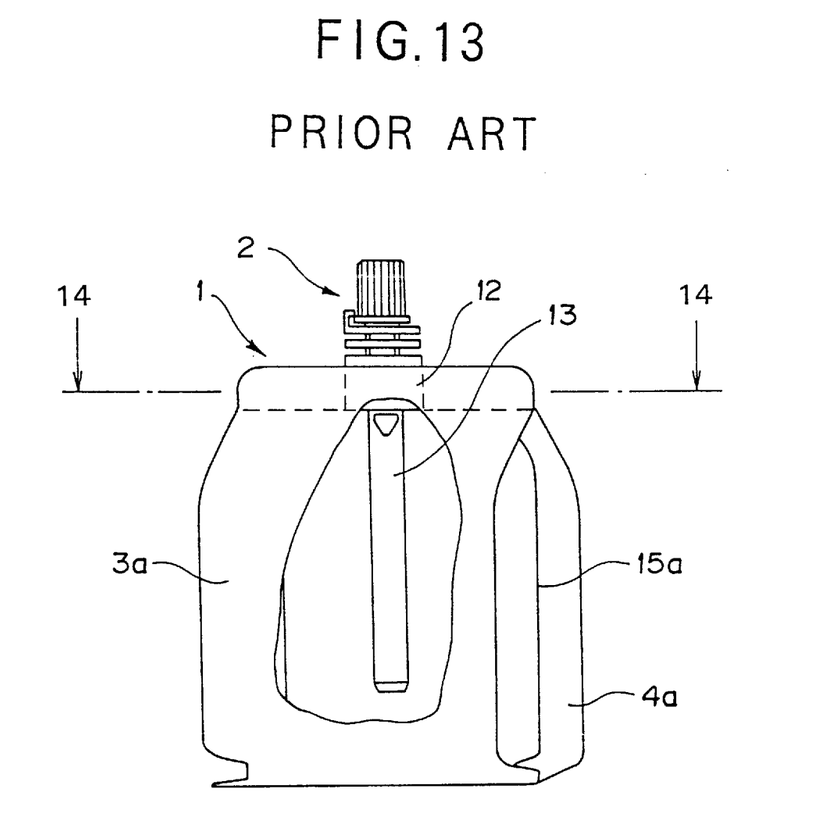
FIG. 13 is a perspective view showing a conventional liquid container.
Figure 14:
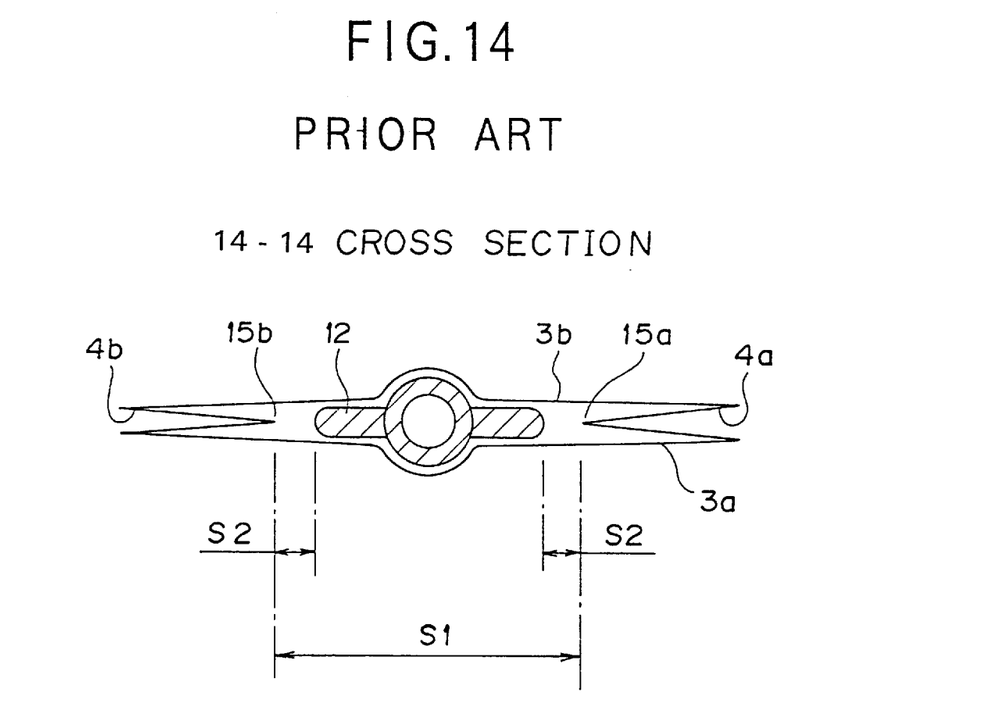
FIG. 14 is a cross-sectional view taken along the lines 14—14 of FIG. 13 and schematically shown.

The above liquid container is, as shown in FIGS. 13 and 14, constituted of a bag-shaped container body 1 having two gusset portions 4(4a, 4b) folded inwardly and two flat portions 3(3a, 3b), and a delivery unit 2 having a flange portion 12 and a conduit portion 13. The gusset portions 4a, 4b folded inwardly are respectively positioned on both sides of the body 1 so that they make a space S1, where the flange portion 12 of the delivery unit 2 is set, between both inward ends 15a, 15b at the upper end portion of the container body 1. Thus, the upper end portion and the flange portion 12 are integrally bonded to each other by means of an usual heat sealing. The liquid container formed in such a manner has gaps S2 which are made between the flange portion 12 and each inward end 15a, 15b of gusset portions.

In the above liquid container, however, the fact that the flange portion 12 of the delivery unit 2 is set in the space S1 between both inward ends 15a, 15b of the gusset portions results in that a horizontal section of the container body 1 is made rectangular and never regularly square, because whole size in width of the gusset portion 4 is narrower than that of the flat portion 3. Therefore, the liquid container is not stable in self-standing and frequently topples down when it is put on a shelf or the rack for displaying.

SUMMARY OF THE INVENTION

It is an object of the present invention to provide a liquid container which has a high stability in self-standing when it is put on a shelf or rack. It is another object of the present invention to provide a preferable manufacturing method for the above liquid container.

In order to achieve the above objects, a liquid container of the present invention comprises: a bag-shaped container body formed of a flexible film and composed of two flat portions which constitute front and back walls and two gusset portions which are folded inwardly to constitute side walls; and a pipe-shaped delivery unit having at least a mouth portion which is formed at an upper end thereof and projects out of an upper end portion of the container body, and a flange portion which is formed below the mouth portion and held at the upper end portion of the container body to constitute a joining portion between the delivery unit and the container body, wherein, each of the gusset portions has a width approximately equal to that of the flat portion, each inward end portions, projected inwardly, of the two gusset portions being positioned between the flange portion and the flat portion at the joining portion.

Further, a manufacturing method for the above liquid container comprises steps of:

preparing two flexible films to be flat portions constituting front and back walls of the container body, other two flexible films each having a width approximately equal to that of the film for the flat portion and being to be gusset portion constituting a side wall of the container body, and a pipe-shaped delivery unit having at least a mouth portion formed at an upper end thereof and a flange portion formed below the mouth portion;

superposing the two films for the flat portions onto each other;

folding and positioning the two films for the gusset portions between the superposed two films for the flat portions in a state that both end portions, in which folding lines are formed, face oppositely in a manner of contacting or coming close to each other;

positioning the delivery unit between the superposed two films for the flat portions in a state that the mouth portion of the delivery unit projects out of an upper end portion of the container body and the flange portion of the delivery unit is set to the upper end portion of the container body; and bonding integrally the respective films for the flat or the gusset portions and the delivery unit by sealing predetermined portions thereof, wherein each of the films for the gusset portions is temporarily bonded to the film for the flat portion before positioning the delivery unit, and each end portion, in which folding lines is formed, of both the films for the gusset portions is interposed between the flange portion of the delivery unit and an upper end portion of the film for the flat portions.

According to the above liquid container, the flange portion of the delivery unit is positioned and held at the upper end portion of the container body to form the joining portion in a state that the flange portion overlaps with the inward end portions of the gusset portions. Therefore, each gusset portion is folded deeply to shape a cross section of the container body into an approximately regular square, so that the stability in self-standing is ensured when the liquid container is put on a shelf or rack for displaying.

In the above liquid container, it is preferable that both inward end portions of the gusset portions are disposed on the same side with respect to the flange portion. According to this preferable embodiment, the pipe-shaped delivery unit slants inevitably to a front or back direction of the liquid container, so that an user can put his lip easily on the mouth of the delivery unit to drink the content. Furthermore, indications or letters on the flat portion can be viewed by consumers to improve an effect of the eye-catching if the top of the delivery unit slants to the rear side to direct upwardly the upper portion of the front flat portion even when the liquid container is put on a considerably low shelf.

Oblique seal lines may be formed at four lower corner portions of the container body so as to extend obliquely across the flat portions from one side edge to the bottom edge thereof, and subsequently an outer portion beyond each oblique seal fine and the bottom seal line may be cut off. According to this embodiment, a resistance of the container body against the folding of the bottom edge portion is reduced, so that the bottom portion is flattened easily and the stability in self-standing of the liquid container is improved. In In another preferable embodiment of the above liquid container, the width of top seal lines of the container body which extend from the joining portion to the left and right sides thereof may be formed larger than that of the sealed joining portion, and an edge line of each transitive portion between a lower corner of the joining portion and a lower inner edge of the top seal line may be extended substantially parallel to an axis of the container body. According to this embodiment, the strength of the gusset portions is increased by the enlarged top seal lines in their widths. Furthermore, since each transitive portion between the lower corner of the joining portion and the lower inner edge of the top seal line is extended substantially parallel to an axis of the container body, a pressure of the content in the liquid container which concentrates on the lower corners of the joining portion is decreased to improve the strength of this portion and to prevent pinholes and breakages of the liquid container.

On the other hand, according to the above manufacturing method, it is easy to conduct the positioning of the films for the flat and gusset portions. Simultaneously, the delivery unit and the films for any parts of the container body can be sealed under a stable condition by the temporarily bonding of the films for the gusset portions.

It is preferable to constitute the above manufacturing method so that the two films for the gusset portions are put on the predetermined positions of the film for the flat portion, and subsequently they are temporarily bonded to the film for the flat portion by heat sealing in which a seal bar is pressed onto the films so as to cross over the folding lines of the films for the gusset portions at an upper portion of the container body. According to this embodiment, a productivity of the liquid containers is increased and generation of the defectives is decreased, because the inward end portions of the gusset portions do not collide with the delivery unit during the positioning thereof onto the gusset portions, and do not disturb the positioning of the delivery unit.

In the case where such a temporary bonding is conducted in the above preferable manner with the seal bar, the seal bar may have a sealing surface which comprises a triangle recess at its center portion on one side thereof, each edge of the recess crossing obliquely over the folding lines of the films for the gusset portions so that a sealing area is enlarged toward a direction of a side portion of the container body. Thus the strength of the liquid container against the various impacts, such as an impact when the container drops down, can be increased by a specific sealing area of the temporary bonding which corresponds to the above sealing surface of the seal bar.

BRIEF DESCRIPTION OF THE DRAWINGS

FIGS. 6A and 6B are views of another embodiment of the liquid container according to the present invention showing a state that it is inflated, in which

DESCRIPTION OF THE PREFERRED EMBODIMENTS

The preferred embodiments of the present invention will be explained hereunder with reference to the accompanying drawings.

Figure 1:
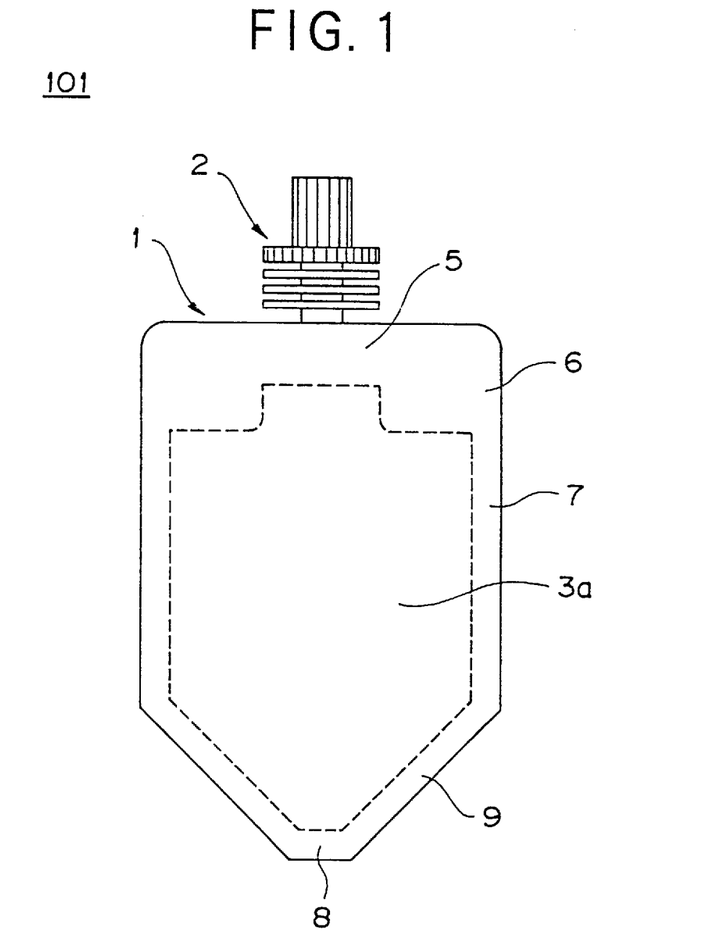
FIG. 1 is a front view showing an embodiment of the liquid container according to the present invention.
Figure 2:
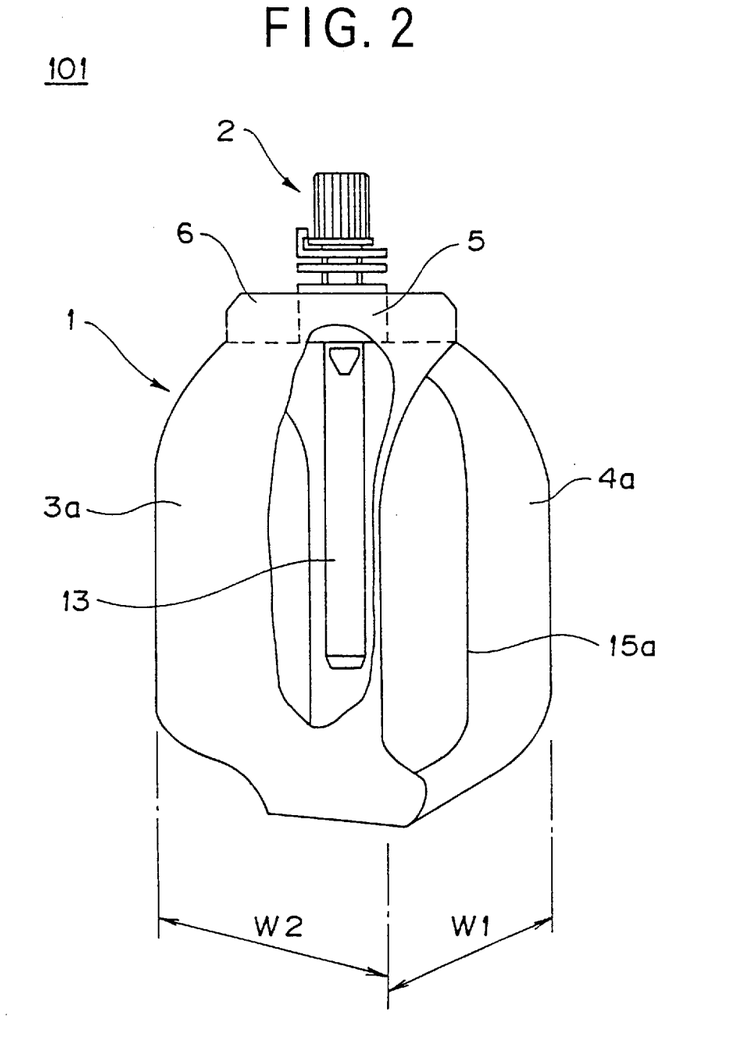
FIG. 2 is a perspective view of the liquid container showing a state that it is inflated according to the present invention shown in FIG. 1.
Figure 3:
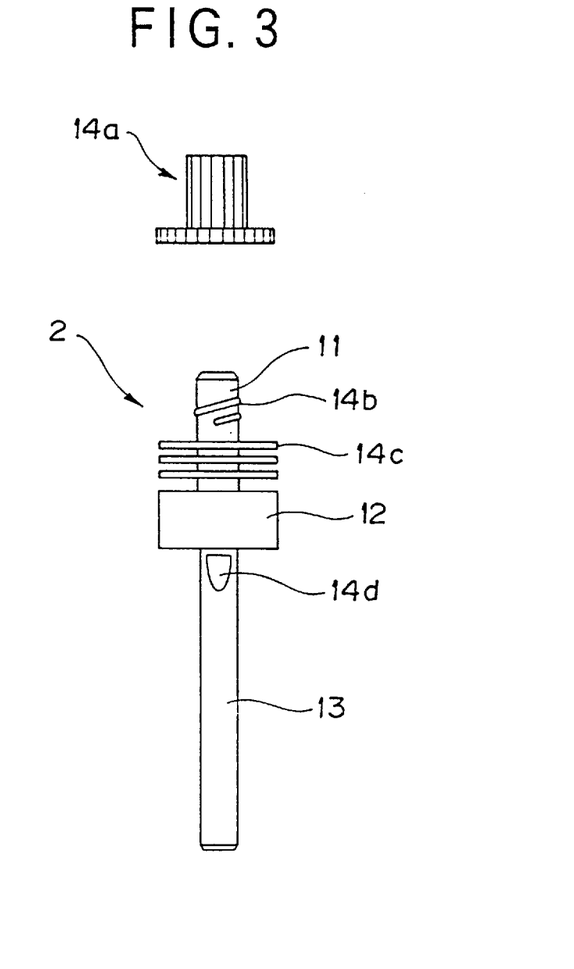
FIG. 3 is a front view showing a delivery unit of the liquid container according to the present invention shown in FIG. 1.

FIG. 1 is a front view showing a liquid container 101 which is one embodiment of the liquid container according to the present invention, FIG. 2 is the perspective view showing the liquid container 101 in an inflating state, and FIG. 3 is a front view showing a delivery unit. Referring to these figures, the liquid container 101 is constituted of a bag-shaped container body 1 formed of flexible film and a pipe-shaped delivery unit 2 usually formed of plastics. The container body 1 is provided with the joining portion 5 at the upper end portion of the body 1, and thus the flange portion 12 of the delivery unit 2 is bonded to the inner surface of the joining portion 5 of the container body 1. The container body 1 is composed of the two flat portions 3(3a,3b) which constitute front and back walls and the two gussets portions 4(4a,4b) which are folded inwardly to constitute the side walls of the body 1. The body 1 is provided with the respective seal lines which are formed at the peripheries thereof and include top seal lines 6 extending to the right and left of the joining portion 5, side seal lines 7, a bottom seal line 8 and oblique seal lines 9. These seal lines are usually formed by means of heat sealing.

The delivery unit 2 has a long and pipe-like shape, which is provided with at least a mouth portion 11 formed at the upper end thereof, and a flange portion 12 formed below the mouth portion 11 to join the delivery unit 2 and the container body 1 with each other. Furthermore, the unit 2 may be provided with other parts, for example, a conduit portion 13 which is formed below the flange portion 12 to improve the function as a straw, a screw portion 14b at the mouth portion to tighten a cap 14a, a supporting flange portion 14c to support the delivery unit on a guide for guiding only delivery unit or the liquid container with the delivery unit, and a hole portion 14d to be a path for the purpose of draining air at the filling time and draining the content in a manner that the liquid container is turned upside down.

Figure 4:
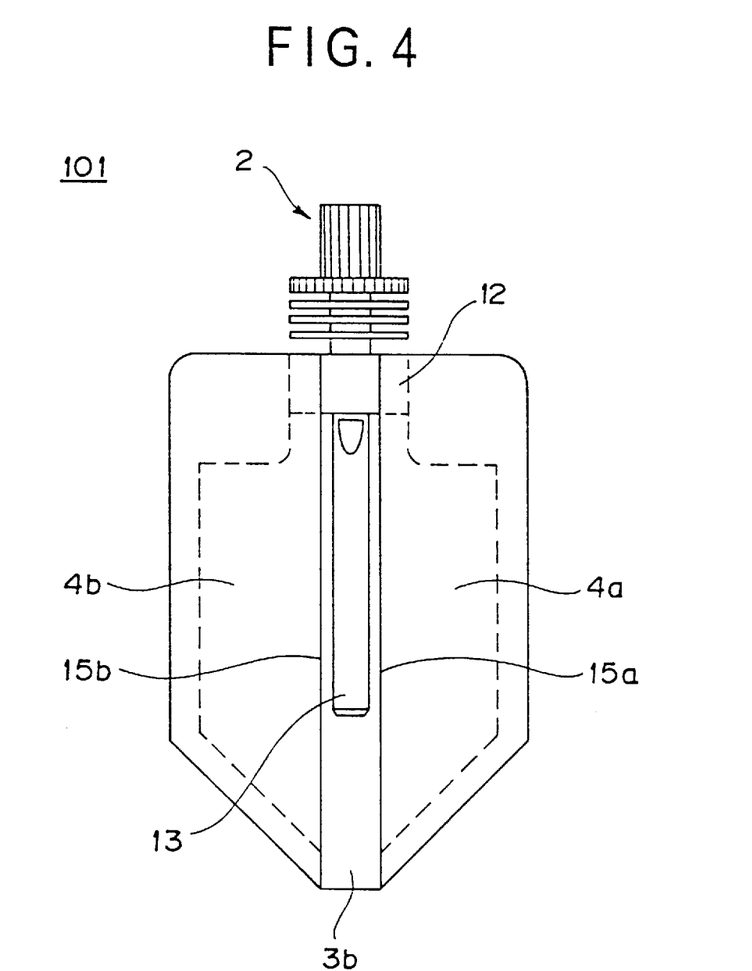
FIG. 4 is an explanatory view showing an inner constitution of the liquid container according to the present invention shown in FIG. 1.

FIG. 4 shows a state that the front flat portion 3a is eliminated from the liquid container 101. That is, the delivery unit 2 is disposed at the center of back flat portion 3b, and both gusset portions 4a, 4b are disposed on both sides thereof. As can been understood from FIGS. 2 and 4, the conduit portion 13 of the delivery unit 2 extends inwardly of the container body 1, so that the delivery unit 2 serves as a straw. In the present invention, the inward end portions 15 (the folding lines) are disposed at deep positions close to the center of the container body, because it is necessary to make a whole width W1 of each gusset portion approximately equal to that W2 of the flat portion for the purpose of improving stability in self-standing. Thus, the two inward end portions 15a, 15b faces oppositely with coming close to each other from the both sides of the container body or contacting mutually at the center of the container body in some cases. At this time, a whole area or a partial area of the flange portion 12 is covered with the respective inward end portions 15.

Figure 5A:
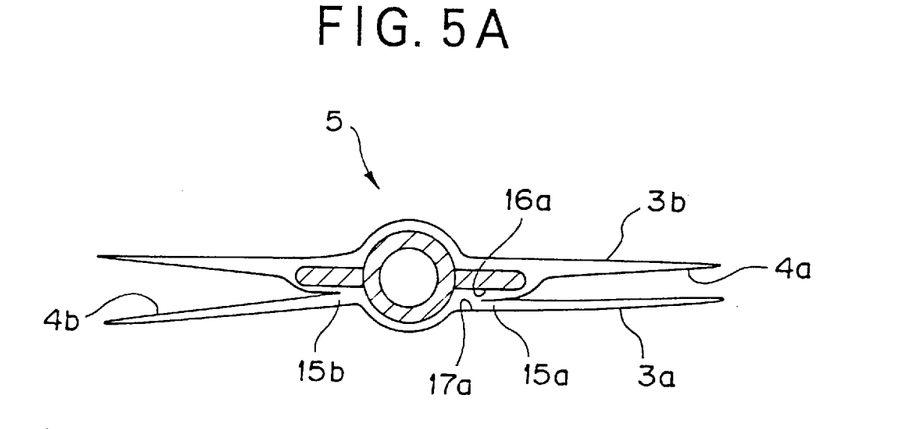
FIGS. 5A and 5B are cross-sectional views schematically showing two embodiments of the joining portion for the delivery unit.
Figure 5B:
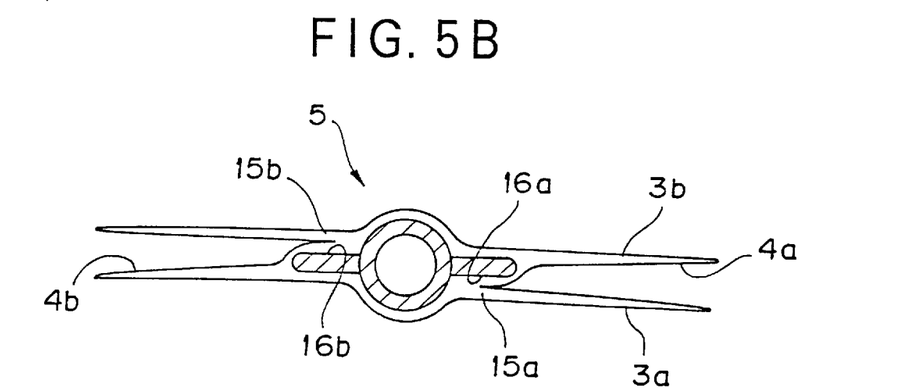

Therefore, in the liquid container of the present invention, as can be seen in FIG. 5 schematically showing the sectional view of the joining portion 5, the surfaces 16(16a, 16b) of the flange portion and inner surface 17(17a,17b) of the flat portion corresponding to the joining portion are fastened mutually through the inward end portions 15(15a, 15b) of the folded gusset portions. FIG. 5A illustrates a type of the above liquid container 101 in which both the two inward end portions 15a, 15b of the gusset portions are disposed on the front surface 16a of the flange portion. On the other hand, FIG. 5B illustrates another type in which the inward end portion 15a of the right gusset portion 4a is disposed on the front surface 16a of the flange portion, and the inward end portion 15b of the left gusset portion 4b is disposed on the back surface 16b thereof.

Figure 6A:
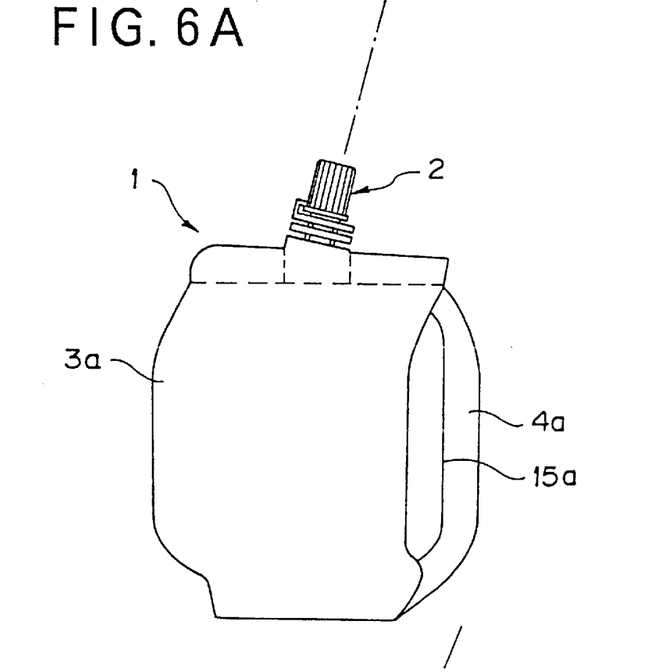
FIG. 6A is a perspective view and FIG. 6B is a side view.
Figure 6B:
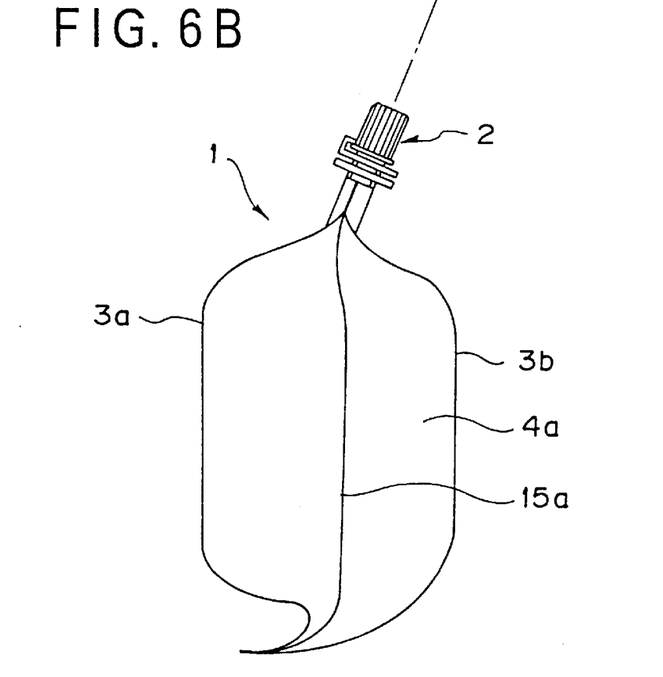

In any case of the above two types, the shape of the sectional view of the liquid container becomes approximately regular square when the liquid container has been filled up to improve the ability in self-standing thereof. The type of FIG. 5A is, however, preferable rather than that of FIG. 5B. In a case where the right and left inward end portions of the gusset portions are disposed on the same side (the front or the back side) of the flange portion, the long delivery unit slants in the direction opposite to the side of disposition of the inward end portions of the gusset portions with respect to the flange portion as shown in FIGS. 6A and 6B. Therefore, it is convenient to be utilized as the straw. Because, an user can easily insert the upper opening end of the delivery unit into his mouth in a state wherein he keeps the container upright without slanting the container. Furthermore, the indications, e.g. letters or pictures, printed on the flat portions are emphasized to improve the eye-catching effect. That is, in a case of FIGS. 6A and 6B, the delivery unit 2 is obliqued backwardly to direct the shoulder portion of the front surface of the front flat portion 3a. Therefore, even if the container is put on a relatively low shelf or rack, a consumer can see clearly the indications on the front flat portion.

Figure 7A:
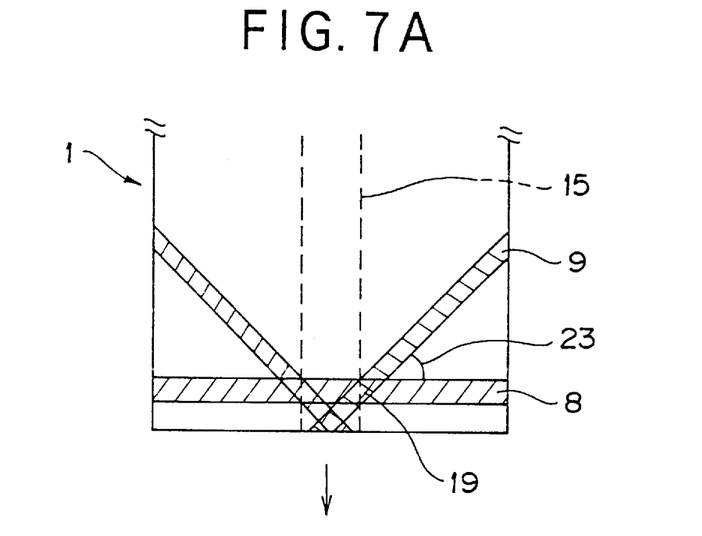
FIGS. 7A and 7B are views showing a bottom portion of the liquid container according to the present invention shown in FIG. 1.
Figure 7B:
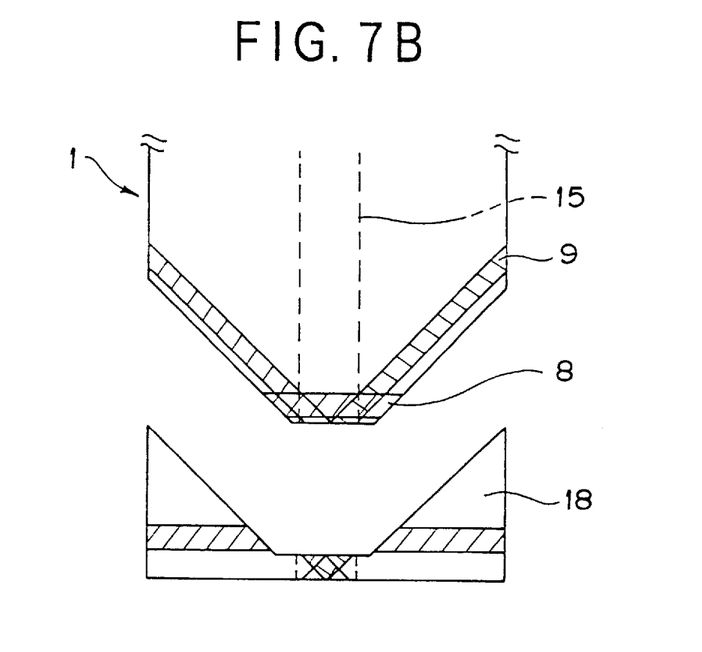

There are four lower corner portions at the bottom side of the container body, that is, the front-right, the front-left, the back-right, and the back-left corner portions. As shown in FIGS. 7A and 7B, the oblique seal lines 9 may be formed at the respective lower corner portions as if said lower corner portions were cut off obliquely by the oblique seal lines 9, and subsequently a portion 18 outer than the oblique seal lines 9 and a bottom seal line 8 may be cut off from the container body 1. According to this embodiment in which the bottom portion is formed into a reversed trapezoidal shape, since the bottom portion is flattened easily when the liquid container is put on the table, it has a high ability in self-standing. The oblique seal lines 9 are formed so as to extend from a predetermined point on the side edges of the flat portions to another predetermined point on the lower edge thereof, passing through a position 19 where the folding lines formed in the inward end portions 15 of the gusset portions cross over the bottom seal lines 8. An angle 23 between the oblique seal line 9 and the bottom seal line 8 is usually set at approximately 45 degrees.

Figure 8:
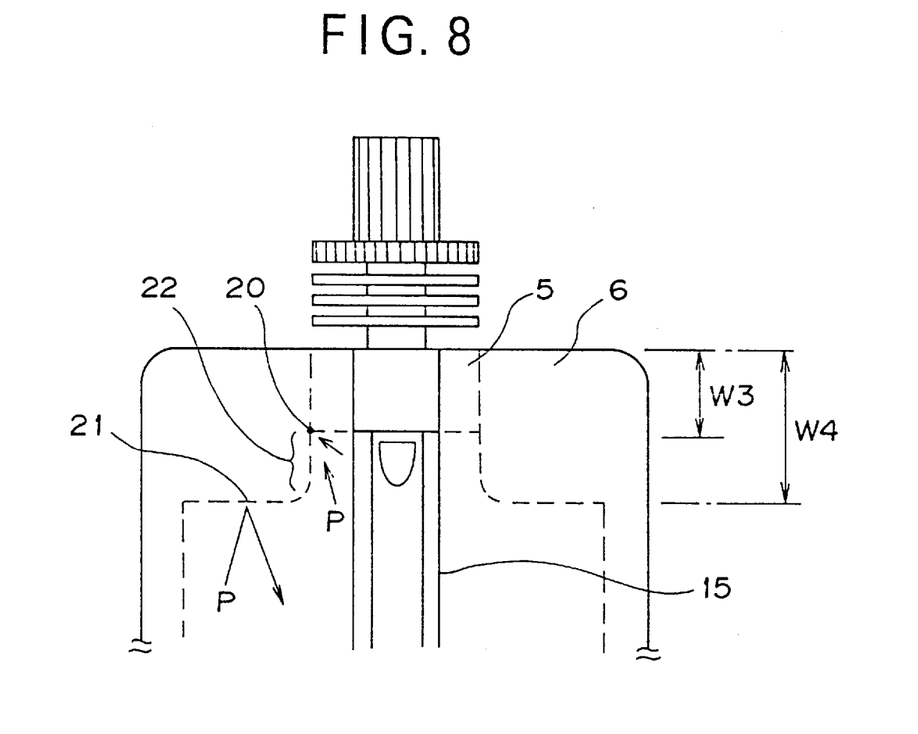
FIG. 8 is a view showing an upper portion of the liquid container according to the present invention shown in FIG. 1.

In the liquid container according to the present invention, since the top seal lines 6 where the front and the back flat portions are sealed together by the medium of the gusset portions are apt to break easily as compared with other seal lines and other portions, it is preferable that the width W4 of the top seal lines 6 is enlarged, as shown in FIG. 8, than that W3 of the seal line forming the joining portion 5 to increase the strength of the top seal lines 6. If, in this case, the edge line of each transitive portion 22 between the lower corner 20 of the joining portion 5 and the lower edge 21 of the top seal line 6 is extended substantially parallel to the axis of the container body, the pressure P of the content in the liquid container does not concentrate on the lower corners 20 of the joining portion 5, and consequently the liquid container is prevented from generation of pinholes and breakages at the lower corners 20 thereof. Therefore, stable quality of the seal portion is ensured at the upper end portion including the joining portion 5 and the top seal lines 6 of the container body 1.

Figure 9:
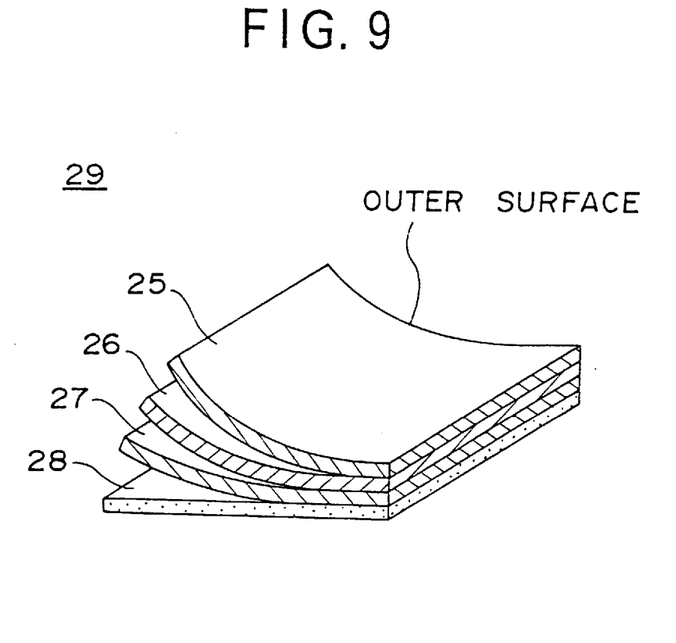
FIG. 9 is a view showing a constitution of an embodiment of films to form the container body.

As to the flexible films for the flat and gusset portions of the container body, for example, the composite film 29 as shown in FIG. 9 is utilized to ensure flexibility of the container body. The composite film 29 is composed by laminating a polyester film 25 to be the outermost layer, a film 26 having a barrier property, a film 27 selected from the group consisting of polyester films or oriented nylon films, and a polyethylene film 28 to be the innermost layer in this order. More concretely, the composite films listed hereinafter are preferably utilized.

(1) OPET(12 $\mu$m )/Al(9 $\mu$m)/ON(15 $\mu$m)/PE(60–120 $\mu$m)

(2) OPET(12 $\mu$m)/Al(9 $\mu$m)/OPET(12 $\mu$m)/PE(60–120 $\mu$m)

(3) OPET(12 $\mu$m)/EVOH(9 $\mu$m)/OPET(12 $\mu$m)/PE (60–120 $\mu$m)

The meanings of the above abbreviations are as follow and the brackets are the thickness of the films:

"OPET"; The oriented polyethylene-terephthalate film

"Al"; The aluminum foil

"ON"; The oriented nylon film

"PE"; The polyethylene film

"EVOH"; The ethylene/vinyl alcohol copolymer film

Figure 10:
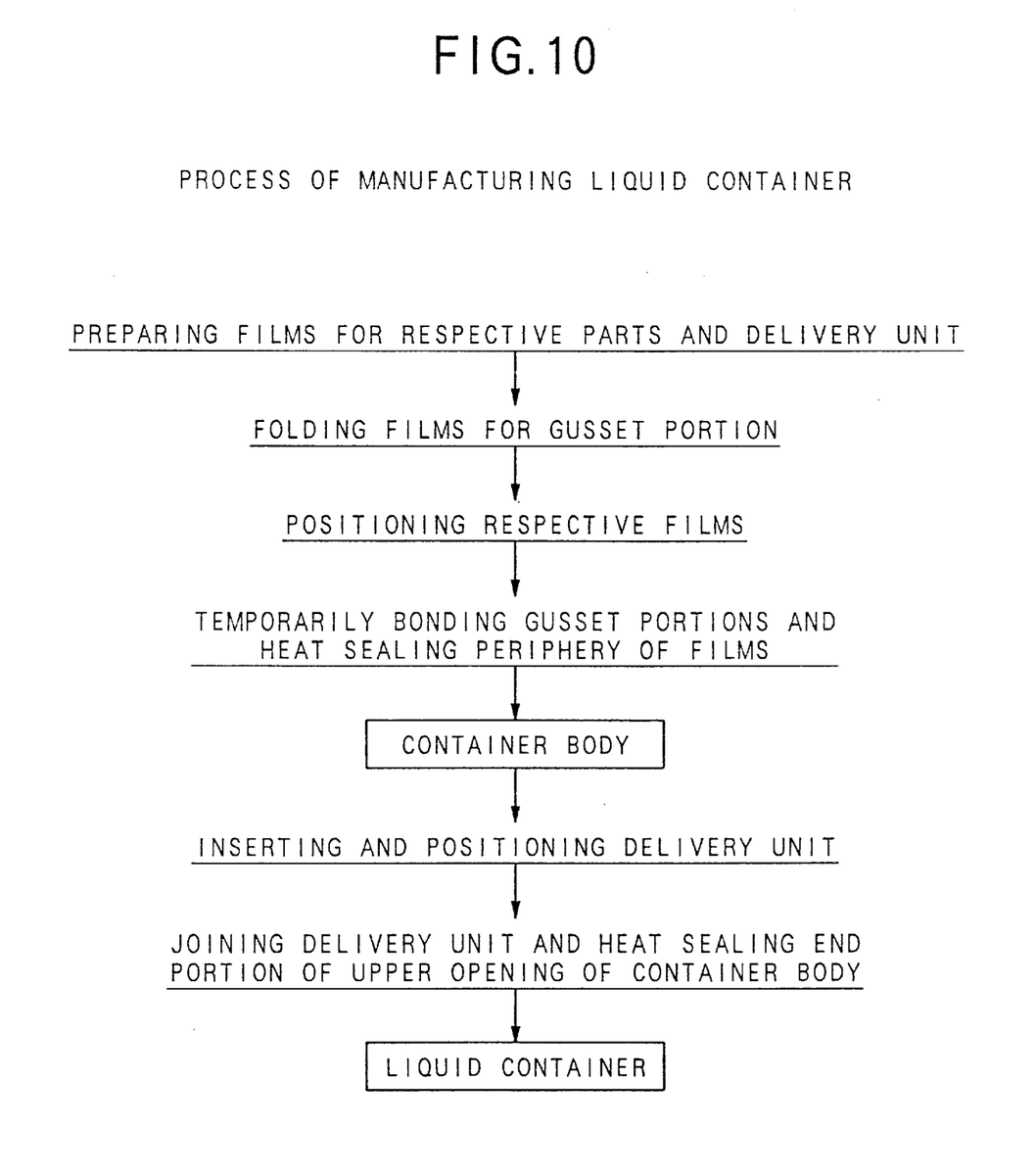
FIG. 10 is a flow diagram showing an embodiment of a manufacturing method according to the present invention.

Next, the manufacturing method for the above mentioned liquid container will be explained. There is described hereunder regarding the case where the liquid containers are manufactured one by one, but that method can be adapted to continuously manufacturing a plurality of liquid containers. FIG. 10 shows generous operations of one example of the manufacturing method.

At the beginning, the flexible film is cut into predetermined dimensions to prepare two films to be the flat portions of the container body and two films to be the gusset portions having a width equal to that of the flat portion. The pipe-shaped delivery unit is also prepared at the same time.

After the preparing, two films for the flat portions are superposed onto and positioned to each other. The films for the gusset portions are folded back to form the folding lines extending in the longitudinal direction thereof, and subsequently a pair of the folded films for the gusset portions are set between two superposed films for the flat portions so that the outer edges of the films for the gusset portions are positioned at the outer edges of the films for the flat portions and so that a pair of inward end portions which are projected inwardly and faces oppositely are brought into contact with or close to each other.

After the above positioning, a pair of films for the gusset portions are temporarily bonded to the film for the flat portion by heat sealing at the predetermined positions on the films. The heat sealing is conducted for example, for one second at 250° C. The temporary bonding stabilizes the positions of the respective films and the delivery unit at the time of the seal work. The side seal lines of the liquid container may be formed on demand before the temporary bonding.

Figure 11:
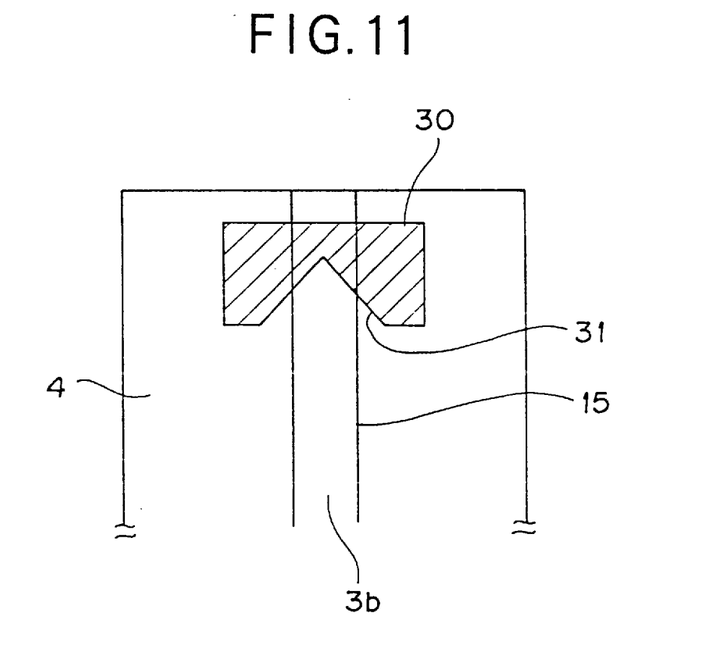
FIG. 11 is a view showing an embodiment of the temporary bonding.
Figure 12:
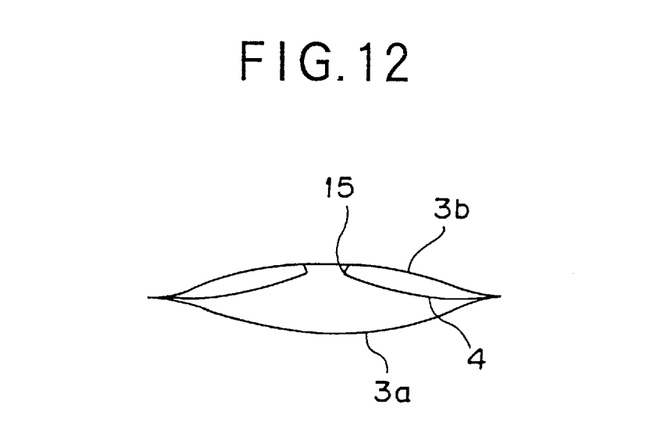
FIG. 12 is another view showing the temporary bonding shown in FIG. 11.

As shown in FIG. 11, the temporary bonding is usually conducted at the position which will be the upper portion of the container body. When the temporarily bonding is conducted, it is preferable that the heat sealing is carried out while pressing the seal bar onto the flat portion so as to cross over the folding lines of the inward end portions 15, so that both inward end portions 15 of the gusset portions 4 are bonded to one of films for the flat portions. According to this manner, the films for any parts and the delivery unit are positioned easily, because the inward end portions 15 of the gusset portions do not collide with the delivery unit when the delivery unit is put near the gusset portion 4. In particular, in case that the container body is formed previously and thereafter the delivery unit is inserted therein and joined thereto, a pair of gusset portions 4 are located on one side 3a of the two flat portions 3a, 3b near the upper opening of the container body as shown in FIG. 12. Therefore, it is easy to handle the delivery unit and the container body during manufacturing the liquid container.

As shown in FIG. 11, it is preferable that the seal portion 30 of the temporary bonding has a triangle recess at the center portion on one side thereof, and each edge 31 of the recess crosses obliquely over each folding line of the inward end portions 15 of the films for the gusset portions so that the sealing area of the seal portion 30 is enlarged toward the direction of the side portion of the container body. When the seal portion of the temporary bonding is formed into the above shape having the recess, the strength of the top seal lines of the container body against the various impacts, such as an impact when the container drops down, is increased, and thus the breakage at the top seal lines of the container is remarkably reduced.

After the temporary bonding, the periphery of the superposed films is sealed to form the container body which opens at the upper end thereof. Subsequently, the conduit portion of the delivery unit is inserted into the inside of the container body through the upper opening thereof and positioned therein in a state that the flange portion of the delivery unit is set at the upper end portion of the container body so as to be overlapped with both inward end portions of the pair of films for the gusset portions. Then, the end portion of the upper opening of the container body and the flange portion of the delivery unit are sealed together to complete the liquid container.

As to the above process, the order of respective steps can be optionally changed, as long as two films for the gusset portions are temporarily bonded before the positioning of the delivery unit. For example, in the above case, the delivery unit is disposed in the container body after formation of the container body. However, the following operation may be conducted. That is, at first, the two films for gusset portions are positioned on one film for the flat portion to be temporarily bonded thereto, and secondly the delivery unit and another film for the flat portion are positioned thereon, and finally the whole periphery of the films is sealed.

As shown in FIG. 2, thus obtained liquid container has an excellent stability in self-standing when it is displayed or put on the shelf, because the width W1 of each gusset portion is made approximately equal to that W2 of each flat portion so that the sectional view of the container body has an approximately regularly square shape. Therefore, the liquid container according to the present invention is utilized as the container for the beverages, needless to say, also utilized for various things such as the seasonings, the sauces and so forth instead of the glass bottles and plastic containers.

Furthermore, when the sectional view of the container body is approximately regularly square, the liquid container not only has the excellent stability in self-standing but also can ensures a large inner space to store the content while reducing the surface area of the container body. Therefore, the liquid container according to the present invention has no bulky shape irrespective of its relatively large volume.

What is claimed is:

1. A manufacturing method for a liquid container provided with a bag-shaped container body and a pipe-shaped delivery unit comprising the steps of:

providing (1) a first pair of flexible films to be formed into flat portions constituting respective front and back walls of the container body, (2) a second pair of flexible films to be formed into a respective pair of gusset portions constituting an associated pair of side walls of the container body and each of said gusset portions having a width approximately equal to that of each flat portion, and (3) a pipe-shaped delivery unit having at least a mouth portion formed at an upper end thereof and a flange portion formed below said mouth portion;

superposing the first pair of flexible films to be formed into flat portions onto each other;

folding the second pair of flexible films into a respective pair of gusset portions having associated inward end portions which are projected inwardly of the container body and positioning the respective pair of gusset portions between said superposed two films to be formed into flat portions such that both inward end portions, in which folding lines are formed, face oppositely in a manner of contacting or coming close to each other;

positioning the delivery unit between said superposed pair of films such that the mouth portion of the delivery unit projects out of an upper end portion of the container body and the flange portion of the delivery unit is held at the upper end portion of the container body so as to subsequently constitute an upper end joining portion between the delivery unit and the container body; and bonding integrally the respective first and second pairs of films of the flat and gusset portions and the delivery unit by sealing predetermined portions thereof, wherein each of the second pair of films for the gusset portions is temporarily bonded to a respective film of the first pair of films of the flat portions before positioning the delivery unit, and each inward end portion, at which a folding line is formed, of both films of the two gusset portions is interposed between the flange portion of the delivery unit and the upper end joining portion of the film for the flat portion.

2. A manufacturing method for a liquid container according to claim 1, wherein said delivery unit further has a conduit portion extending inwardly of the container body.

3. A manufacturing method for a liquid container according to claim 1, wherein both of said two folded and positioned films for the gusset portions are temporarily bonded to the film for the flat portion by heat sealing in a manner of pressing a seal bar onto the films so as to cross over the folding lines of the films for the gusset portions at an upper portion of the container body.

4. A manufacturing method for a liquid container according to claim 3, wherein said seal bar has a sealing surface which comprises a triangle recess at its center portion on one side thereof, each edge of the recess crossing obliquely over the folding lines of the films for the gusset portions so that a sealing area is enlarged toward a direction of a side portion of the container body.

* * * * *